United States Patent [19]

Kobayashi et al.

[11] 3,713,091
[45] Jan. 23, 1973

[54] WEAR INDICATING ARRANGEMENT FOR BRAKE LININGS OF DISC BRAKES

[75] Inventors: Toyoaki Kobayashi; Toshio Kondo; Naoji Sakakibara, all of Hekikaigun, Japan

[73] Assignee: Aisin Seiki Kabushiki Kaisha, Kariya City, Aich. Pref., Japan

[22] Filed: Oct. 2, 1970

[21] Appl. No.: 77,519

[30] Foreign Application Priority Data

Nov. 1, 1969  Japan..............................44/79449

[52] U.S. Cl. ................................340/52 A, 188/1 A
[51] Int. Cl..............................................F16d 66/02
[58] Field of Search ...........340/52 A, 52 B; 188/1 A; 60/52 B

[56] References Cited

UNITED STATES PATENTS

| | | | |
|---|---|---|---|
| 3,611,283 | 10/1971 | Anders et al. | 340/52 A |
| 2,087,386 | 7/1937 | Norton | 340/52 A |
| 3,363,232 | 1/1968 | Mizsak | 340/52 A |

Primary Examiner—John W. Caldwell
Assistant Examiner—Glen R. Swann, III
Attorney—Pierce, Scheffler and Parker

[57] ABSTRACT

A brake wear indicator for detecting the depth of wear of a brake lining for use on a disc brake, comprising an indicating circuit connected to a source of power and a switch means, said switch means being actuated independently of the braking surfaces of the disc even when the brake linings wear down beyond a predetermined depth whereby the braking surfaces of the disc are not injured.

10 Claims, 13 Drawing Figures

INVENTORS
Toyoaki Kobayashi
Toshio Kondo
Naoji Sakakibara
By Pierce, Scheffler & Parker
Attorneys INVENTORS
Toyoaki Kobayashi
Toshio Kondo
Naoji Sakakibara
By Pierce, Scheffler & Parker
Attorneys INVENTORS
Toyoaki Kobayashi
Toshio Kondo
Naoji Sakakibara
By Pierce, Schiffler & Parker
Attorneys

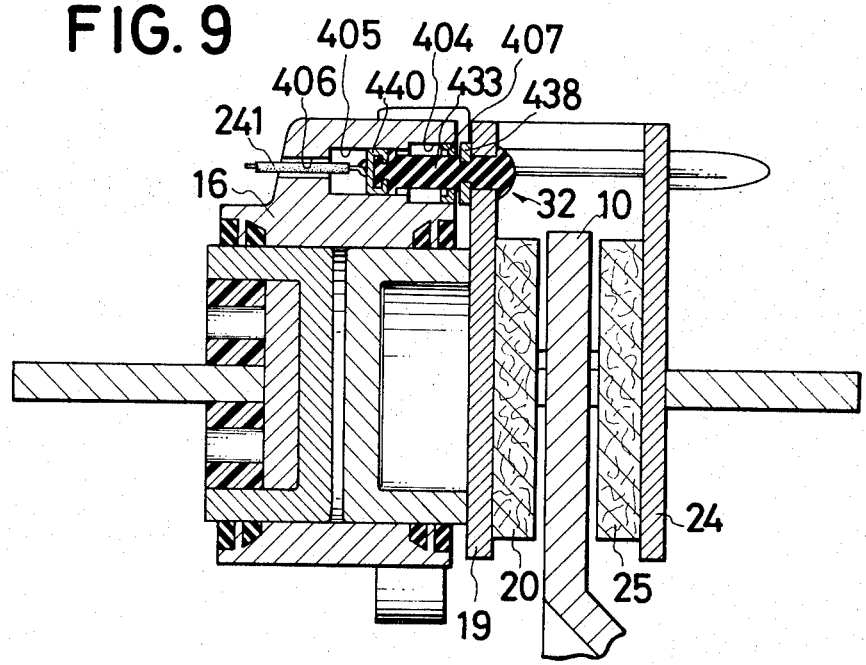
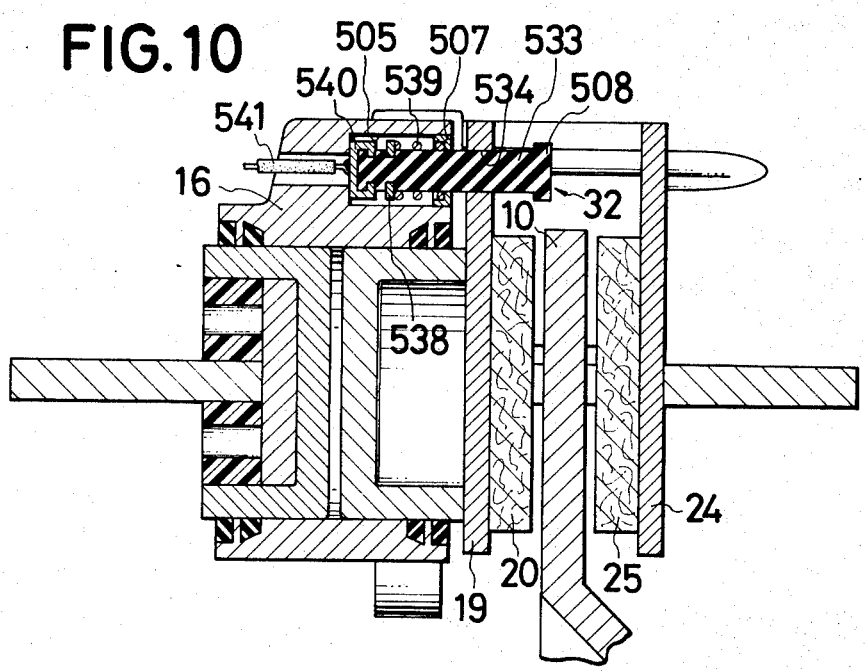

WEAR INDICATING ARRANGEMENT FOR BRAKE LININGS OF DISC BRAKES

BACKGROUND OF THE INVENTION

This invention relates to a wear indicating arrangement, and more particularly to an arrangement for indicating excessive wear of brake linings of disc brakes for use on vehicles.

Various wear indicating devices have been advanced heretofore to provide an indication of wear of the brake linings to a predetermined replacement point. However, these conventional devices have suffered from various limitations and disadvantages. Typically, previous wear indicating devices for the disc brake have included an electrically conductive metal contact or the like imbedded in a brake lining at a predetermined depth. When the brake lining wears to a maximum permissible depth the metal contact becomes exposed to make contact with the braking surfaces of the disc. The contact is connected to a wear indicating circuit comprising a power source for example a battery and a wear indicating means such as a lamp, while the brake disc is connected to ground. The metal contact and braking surfaces of the disc thus function as the terminals of a switch to light the warning lamp upon application of the brakes.

This is undesirable because the brake disc may be damaged due to engagement with the metal contact of the switch, resulting in an undesired effect on the disc. In addition, it is necessary to employ brake linings made from heat resisting materials which are also electrically insulated.

Therefore, the main object of the invention is to provide a wear warning arrangement for brake linings of disc brakes in which the switch means for controlling the wear indicating means does not cooperate directly with the braking surfaces of the brake disc.

It will be apparent that when the switch means is exposed to damage from dirt, mud, water, and other foreign materials, the generation of a false wear indicating signal may result.

Accordingly, another object of the invention is to provide a wear warning arrangement for brake linings of disc brakes in which the switch means is received in and covered by a bore provided in the piston housing of the brakes.

Still another object of the invention is to provide a wear warning arrangement for brake linings of disc brakes in which the brake linings do not require electrical insulating materials.

SUMMARY OF THE INVENTION

The wear indicating arrangement according to this invention comprises an electrical power source, a warning means electrically connected to the power source and switch means, said switch means being actuated independently of the braking surfaces of the disc when the brake linings wear to the replacement point, whereby damage to the braking surface of the disc will be prevented. In alternative forms of the invention the switch means is housed within a bore in the piston housing for providing protection from mud, water, moisture, and other foreign materials.

Other objects and advantages will become apparent to those skilled in the art from the following description with reference to the accompanying drawings which depict several embodiments of the invention for illustrative purpose only, in which parts having the same construction and function throughout all the embodiments have been given the same reference numerals.

BRIEF DESCRIPTION OF DRAWINGS

In the drawings:

FIG. 9 is a sectional view taken along the plane IX—IX of FIG. 8;

FIG. 10 is a view similar to FIG. 9, but showing a fifth modification;

DETAILED DESCRIPTION

Figure 1:
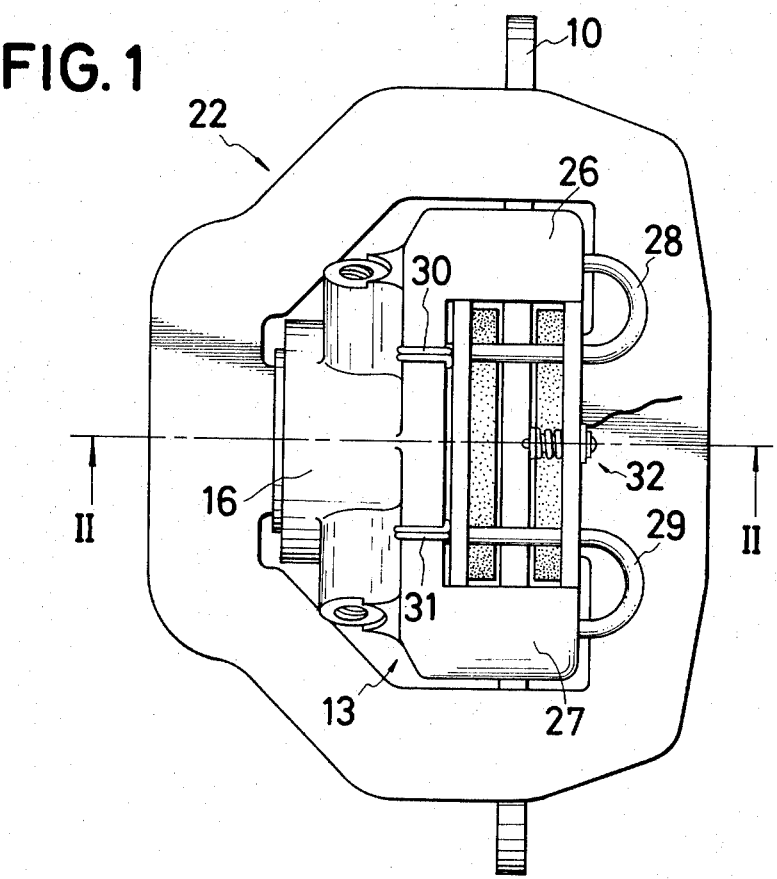
FIG. 1 is a plan view of the disc brake incorporating one form of wear sensing switch means according to the invention.
Figure 2:
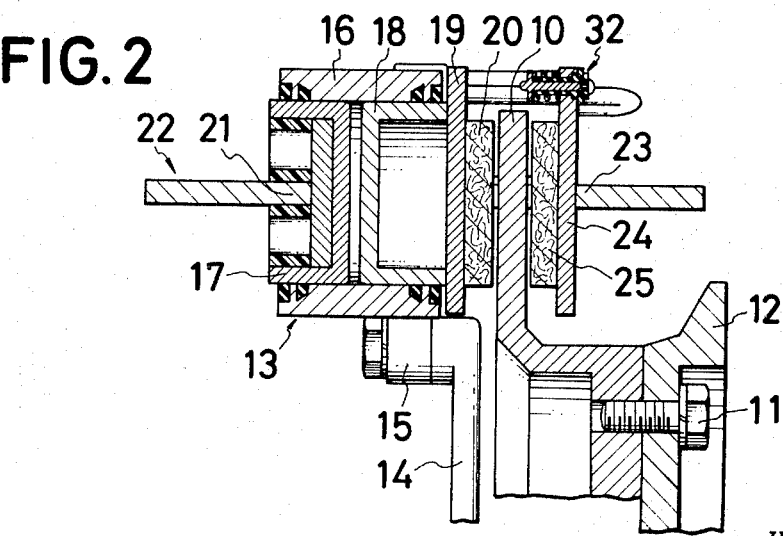
FIG. 2 is a sectional view taken along the plane II—II of FIG. 1.
Figure 3:
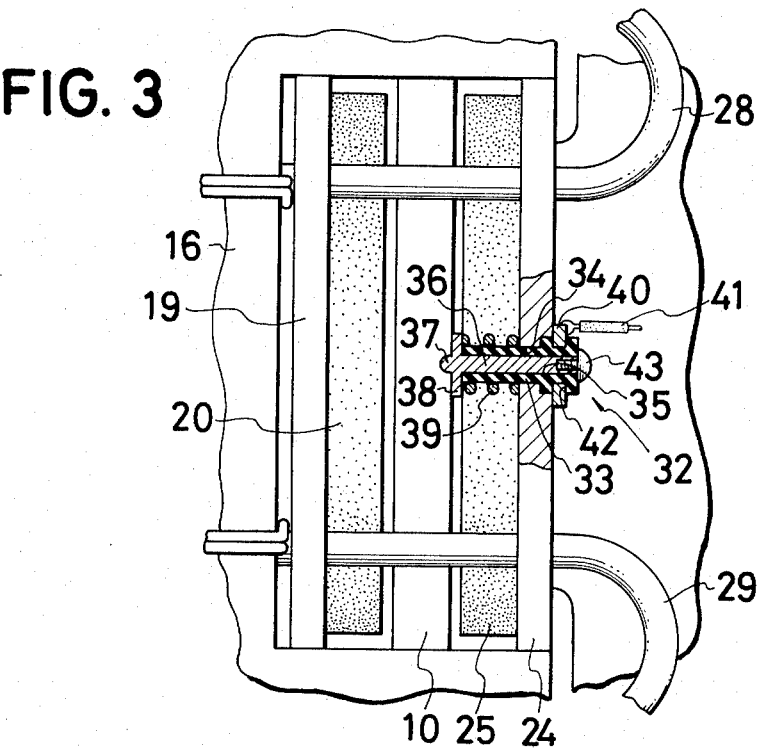
FIG. 3 is an enlarged view similar to FIG. 1.

Referring first to FIGS. 1 to 3, a disc 10 is fixed by bolts 11 to a hub 12 of a vehicle wheel (not shown) and constitutes a rotating brake disc. A brake actuating mechanism 13 is mounted on one side of the disc 10 on a fixed part 14 by means of a bolt passing through a projecting boss 15 on the brake actuating mechanism. The brake actuating mechanism 13 incorporates a piston housing 16 having two open ends within which are slidably fitted two opposed pistons 17 and 18. One piston 18 is directly engaged with a backing plate 19 of a brake lining 20 confronting one of the braking surfaces of the disc 10, while the other piston 17 is engaged with one inner edge 21 of a reaction transfer plate 22 for transferring the piston movement to the other brake lining 25 via its backing plate 24. An inner edge 23 of the reaction transfer plate 22 opposite to the edge 21 is held in holes (not shown) in the backing plate 24.

The brake actuating mechanism 13 has at its sides torque-counteracting arms 26 and 27 formed integrally with the piston housing 16. The backing plates 19 and 24 both extend above their associated brake linings, and the upward extension of each plate is provided with slots (not shown) through which two parallel pins 28 and 29 are passed. One end of each pin is fixed to the piston housing 16 by means of a clip 30 or 31 respectively, which clips prevent axial movement of the pins, and the other end of each pin is bent outwardly and is secured to the torque-counteracting arm 26 or 27 respectively.

In operation, when the brake is applied, the two pistons 17 and 18 are urged apart and the piston 18 applies the brake lining 20 directly to one flat face of the disc 10 while the piston 17 moves the reaction transfer plate 22 in the opposite direction to apply the brake lining 25 to the opposite face of the disc 10, the forces applied to the two brake linings thus being balanced.

The invention comprises a wear indicating switch means 32 in which a tubular insulating member 33 made from a rubber material is movably fitted in a stepped hole 34 of the backing plate 24 and provided with an axially extending hole 35. Within the axial hole 35 of the insulating member 33, there is mounted a switch-shaft 36 which comprises a head 37 and a shoulder 38. A compression coil spring 39 is interposed between the shoulder 38 and backing plate 24 thereby urging the switch-shaft 36 normally towards the brake disc 10. A metal plate 40 electrically connected to terminal wire 41 is tightly fitted in a groove 42 of the insulating member 33. A set screw 43 is screwed into the switch-shaft 36 at the end opposite to its head 37 thereby fixing the insulating member 33 to the switch-shaft 36. It is to be noted that the metal plate 40 makes contact with the backing plate 24 by virtue of the coil spring 39.

When the friction surfaces of the brake linings 20 and 25 have worn down to such an extent that replacement thereof is required, the head 37 of the switch-shaft 36 will make contact with the backing plate 19 upon application of the brakes. The switch-shaft 36, together with the insulating member 33, is thus urged to move to the right by the backing plate 19 against the force of the coil spring 39 whereby the electrical connection between the metal plate 40 and backing plate 24 is cut. The circuit from the wire 41 to the piston housing 16 through the metal plate 40, the backing plate 24, and the pins 28 and 29 is thus cut so that an indicating means such as a warning lamp 44 (FIG. 7) is actuated.

Figure 7:
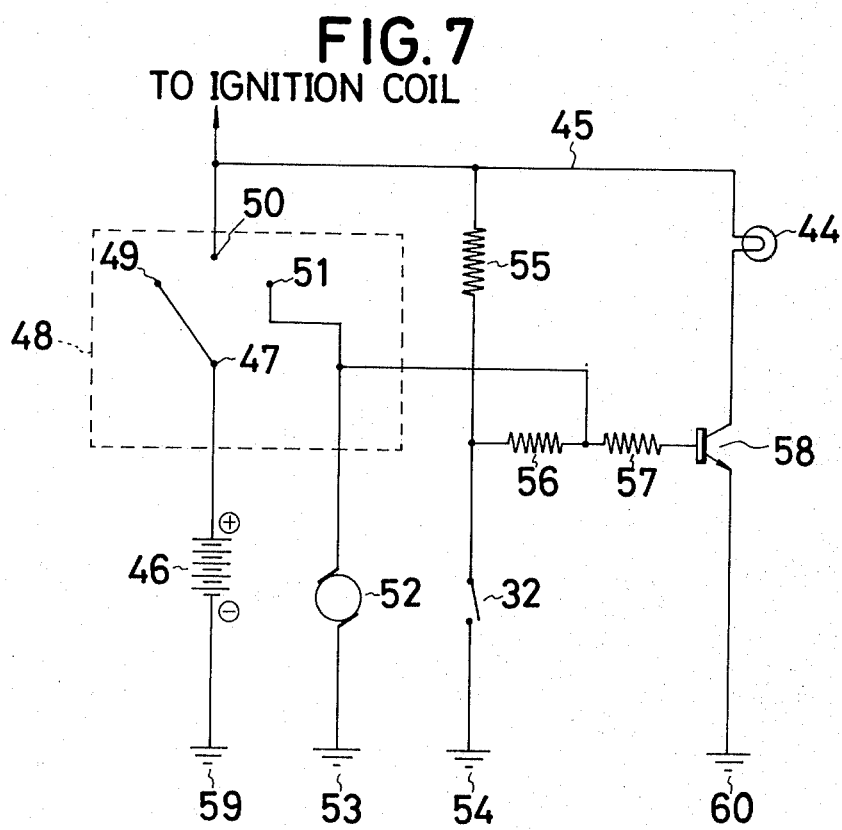
FIG. 7 is a schematic diagram of the electrical system of the invention.

Referring to FIG. 7 an electrical system for performing the above operation is illustrated in a diagrammatic way. In order to operate an indicating circuit 45 including the warning lamp 44, there is provided in series a power source such as a battery 46. One terminal of the battery is connected to ground at 59, whilst its other terminal is connected to a common terminal 47 of an ignition switch 48.

The ignition switch 48 further comprises a terminal 49, an ignition terminal 50 connected to the indicating circuit 45 and to an ignition coil (not shown), and an engine starter terminal 51 connected to an engine starter motor 52. The starter motor 52 is connected to ground at 53. One terminal of the wear indicating switch means 32 is connected to ground at 54, while the other terminal thereof is connected to a resistor 55. Further resistors 56 and 57 are interposed in series between the indicating circuit 45 and base of a transistor 58. The engine starter terminal 51 of the ignition switch 48 is connected to the junctions of the resistors 56 and 57. The collector of the transistor is connected to the warning lamp 44 while the emitter thereof is connected to ground at 60. In operation, when the vehicle is in its running condition the common terminal 47 and ignition terminal 50 of the ignition switch 48 are closed so that the indicating circuit 45 is connected to the battery 46. When the brake linings 20 and 25 are not worn to the permissible depth the switch means 32 is closed so that electric potential of the base of transistor 58 is substantially zero. Thus no current flows through the transistor 58 and the warning lamp 44 is not lit.

When the brake linings wear to the maximum permissible depth, the switch means 32 is opened thereby permitting the current to flow through the transistor. Thus the warning lamp 44 is lit. It should be recognized that when the ignition switch 48 is first actuated, the engine starter motor 52 is connected to the battery 46 through the common terminal 47 and engine starter terminal 51 so that current will flow through the transistor 58 to light the warning lamp 44. Thus the operator may inspect the condition of the electrical system, especially the warning lamp 44 and transistor 58, before operation of the vehicle.

Figure 4:
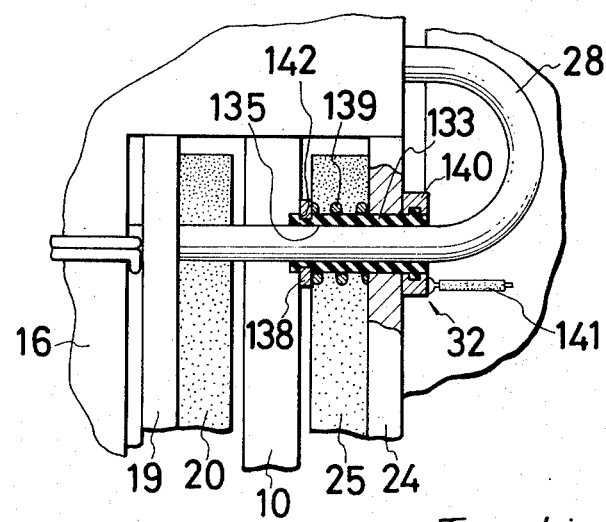
FIG. 4 is a view similar to FIG. 2, but showing a first modification.

In FIG. 4, a first modification of the wear indicating switch means is illustrated in which a tubular insulating member 133 having a bore 135 is slidably mounted on the guide pin 28 and is provided with a groove 142. A spring washer 138 is securely fitted within the groove 142. A compression coil spring 139 is interposed between the washer 138 and backing plate 24 thereby urging the insulating member 133 normally toward the left. A metal plate 140 is mounted on the other end of insulating member 133 and makes contact with the backing plate 24 by the force of the spring 139. A wire 141 is connected to the metal plate 140.

When the metal plate 140 makes contact with the backing plate 24, i.e. when the brake linings 20 and 25 have not worn to the permissible depth, the current through the wire 141 is grounded to the piston housing 16 or vehicle body to close the switch means 32 (FIG. 7), so that the warning lamp 44 is not lit. When the brake linings 20 and 25 wear beyond a predetermined depth, the insulating member 133 makes contact with the relatively advanced backing plate 19 thus causing it to move to the right against the force of the spring 139. As a result the metal plate 140 separates from the backing plate 24 to open the switch means 32. Thus the warning lamp 44 is lit.

Figure 5:
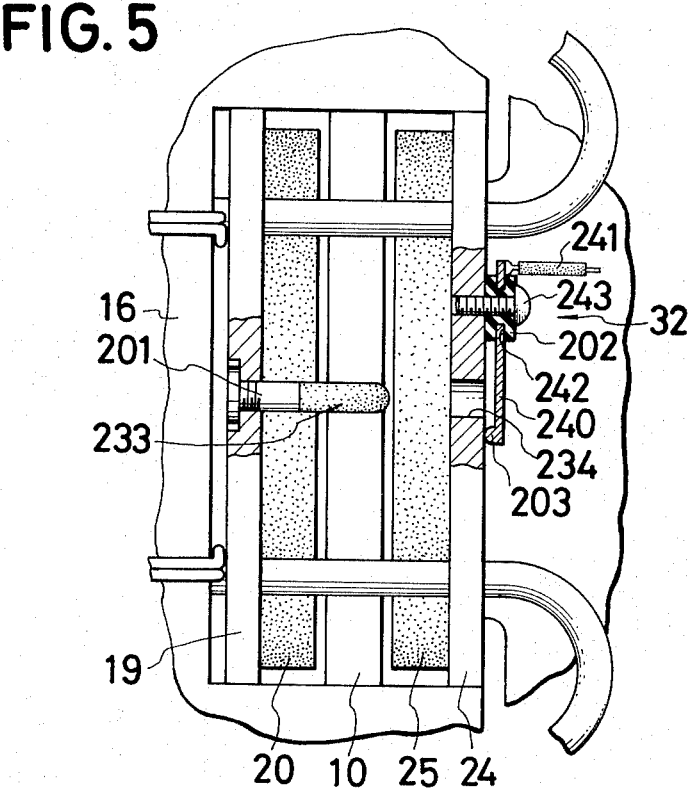
FIG. 5 is a view similar to FIG. 3, but showing a second modification.

In FIG. 5, a second modified form is illustrated in which an insulating shaft 233 is screwed at 201 to the backing plate 19, said insulating shaft being projected in the axial direction of the brake disc. A rubber member 202 is fixed to the backing plate 24 by a set screw 243 and is provided with a groove 242. Within the groove 242 there is fitted a metal plate 240 which includes a protruded end 203 adapted for engagement with the backing plate 24. A hole 234 is bored through the backing plate 24 for permitting the insulating shaft 233 to pass therethrough when the brake linings 20 and 25 wear down. A wire 241 is connected to the metal plate 240.

When the brake linings 20 and 25 are worn beyond the predetermined extent, the insulating shaft 233 pushes the metal plate 240 to the right thereby causing the contact point 203 of the metal plate to separate from the backing plate 24 upon application of the brakes. Thus the warning lamp 44 is lit.

Figure 6:
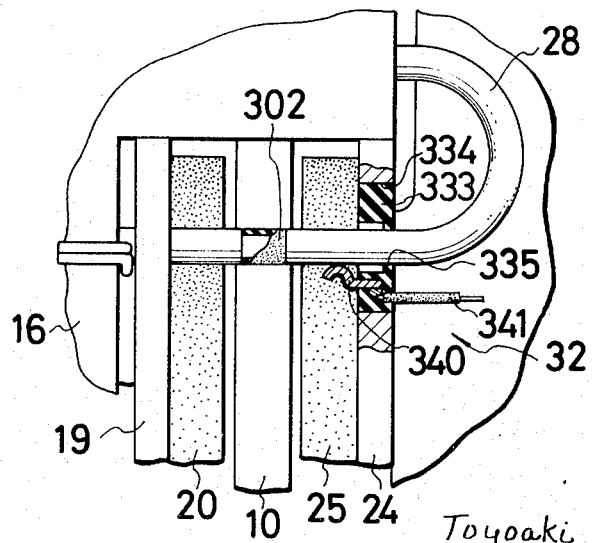
FIG. 6 is a view similar to FIG. 3, but showing a third modification.

A third modification of the switch means 32 is shown in FIG. 6. In this form, a first insulating member 333 is disposed in a hole 334 of the backing plate 24. The guide pin 28 is slidable in a central bore 335 of the insulating member 333. A metallic contacting piece 340 is imbedded in the insulating member 333 and adapted to engage the pin 28. A second tubular insulating member 302 is fitted in a groove provided about the pin 28, said insulating member 302 being positioned at an intermediate portion thereof between the two backing plates 19 and 24. An electrical wire 341 is connected to the metal contact 340.

When the brake linings 20 and 25 are suitable for use, the metallic contact 340 engages the guide pin 28 and is grounded to the piston housing 16 or vehicle body so that the warning lamp 44 is not lit. When the brake linings wear down excessively, the metal piece 340 engages the tubular insulating member 302 because of the advancement of the backing plate 24 towards the brake disc 10 so that the warning lamp 44 is lit.

Figure 8:
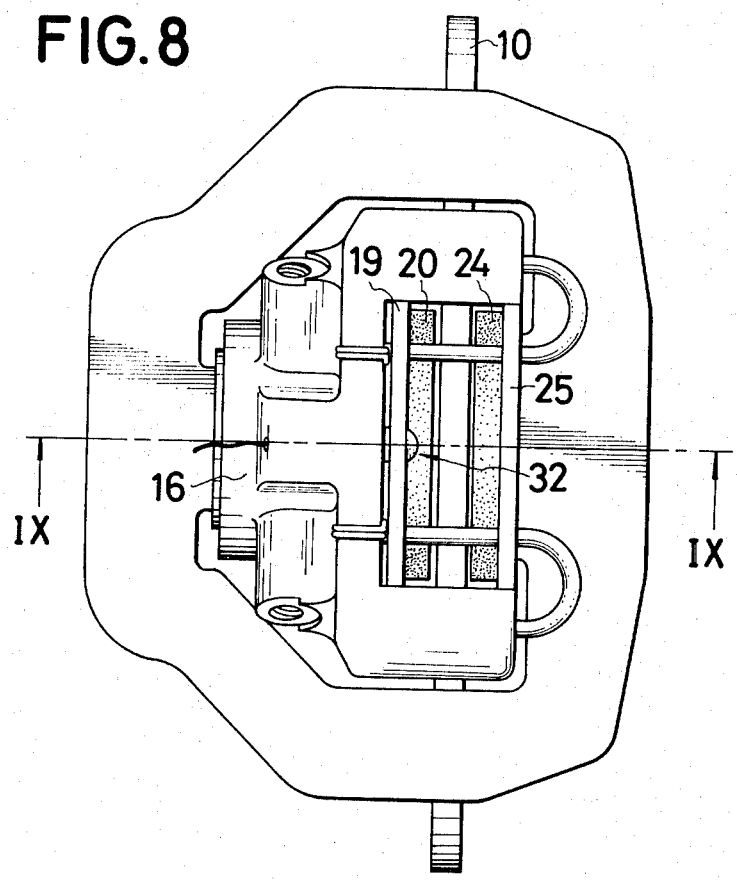
FIG. 8 is a view similar to FIG. 1, but showing a fourth modification.

In order to protect the switch means from mud, water, dirt, and other foreign materials, the switch means 32 may be imbedded in the piston housing 16 as illustrated in FIGS. 8 and 9.

In FIG. 9, a fourth modification is more specifically shown. In this form, one end portion of an insulating member 433 is securely mounted on the backing plate 19 by means of washer 438, while the other end thereof is received in the stepped bore of the piston housing 16, said stepped bore being comprised of a larger diameter portion 404, an intermediate portion 405, and a smaller diameter portion 406. At the extremity of the left end of the insulating member 433, there is secured an electrical contact member 440 to which a wire 441 is connected through the smaller bore 406. The electrical contactor 440 makes contact with and is slidable in the intermediate bore 405, so that the current from the wire 441 will flow to the piston housing 16 when the brake linings 20 and 25 have a permissible depth. At the opened free end of the larger diameter bore 404, there is sealingly and fixedly attached a metallic cover 407. It should be noted that the insulating shaft 433 is slidable with the backing plate 19 in the central bore of the cover 407.

When the brake linings 20 and 25 wear down beyond a permissible depth, the backing plate 19 is moved to the right thereby causing the electrical contacting member 440 to leave the intermediate bore 405 of the piston housing 16 and to move into the larger diameter bore 404. Thus the circuit through wire 441 is broken and the warning lamp 44 is lighted.

The electrical system for the above operation is illustrated in FIG. 7 in the same manner as that of the foregoing embodiments, so that the description thereof will be omitted.

The electrical system of FIG. 7 is also applicable to a fifth modified form shown in FIG. 10. In this form, an insulating member 533 is slidably mounted in a hole 534 of the backing plate 19. One end of the insulating shaft 533 is provided with a shoulder 508 while its other end is provided with an electrical contacting member 540 fixed thereto which is received in a bore 505 of the piston housing 16. At the opened free end of the bore 505, there is sealingly and fixedly attached a metallic cover 507 in the central hole of which the insulating member 533 is slidable in its axial direction. A compression coil spring 539 is interposed between the metallic cover 507 and a spring washer 538 fitted in a groove of the insulating member 533 thereby urging the insulating member 533 normally to the left, so that electrical contactor 540 normally contacts the piston housing 16. The contactor 540 is connected with a wire 541, which permits the current to flow to the piston housing 16 thereby closing the circuit for indicating wear.

When the brake linings 20 and 25 wear down beyond the predetermined depth, the backing plate 19 will move the insulating member 533 to the right by engagement with the shoulder 508 through the last motion arrangement. Thus the electrical contacting member 540 separates from the piston housing 16 to open the circuit, thus lighting the warning lamp 44.

Figure 11:
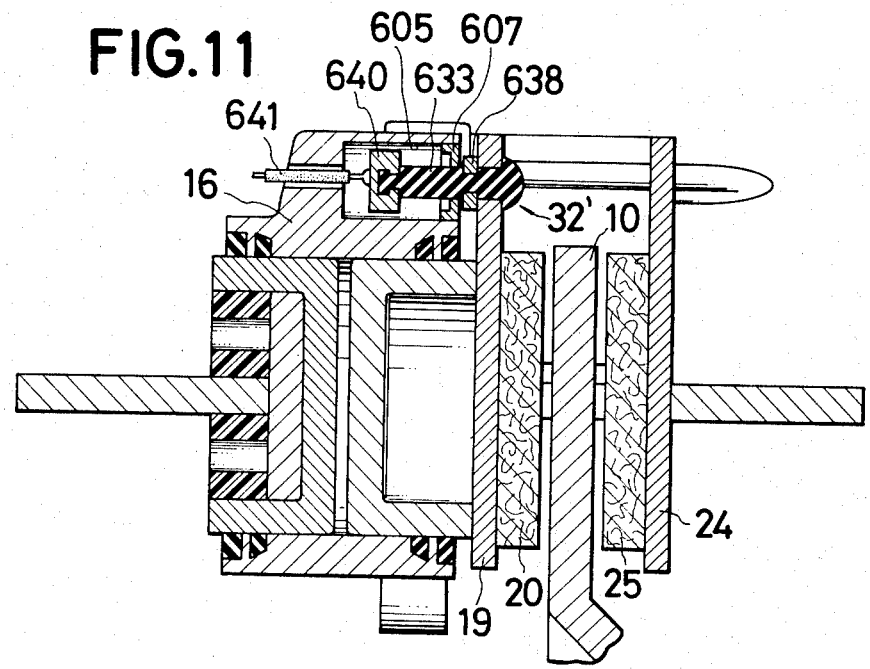
FIG. 11 is a view similar to FIG. 9, but showing a sixth modification.

In FIG. 11, a sixth modification is illustrated in which an insulating member 633 is fixed at its one end to the backing plate 19 by a spring washer 638. The other end of the insulating member 633 is provided with an electrical contacting member 640 loosely received in a bore 605 of the piston housing 16. There is sealingly and fixedly attached to the opened free end of the bore 605 a metallic cover 607 in the central hole of which the insulating member 633 is slidably mounted. A wire 641 is connected to the electrical contacting member 640.

When the brake linings 20 and 25 are suitable for use, the electrical contactor 640 is separated from the piston housing 16 and metallic cover 607 so that the switch means 32' (FIG. 13) is opened and the warning lamp 44' is not lit. When the brake linings 20 and 25 are worn below a permissible depth, the backing plate 19 is moved towards the brake disc 10 whereby the electrical contactor 640 makes contact with the metallic cover 607 to close the switch means 32' and light the lamp 44'.

Figure 13:
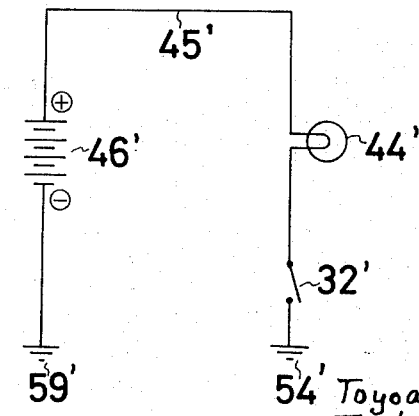
FIG. 13 is a view similar to FIG. 7, but showing an alternative form of the electrical system especially for use with the sixth and seventh embodiments.

In FIG. 13, the indicating circuit 45' comprises the warning lamp 44', one terminal of which is connected to the battery 46' which is grounded at 59'. The other terminal of the warning lamp 44' is connected to the switch means 32' which is grounded at 54'. Thus, when the switch means 32' is closed the warning lamp 44' is lit.

Figure 12:
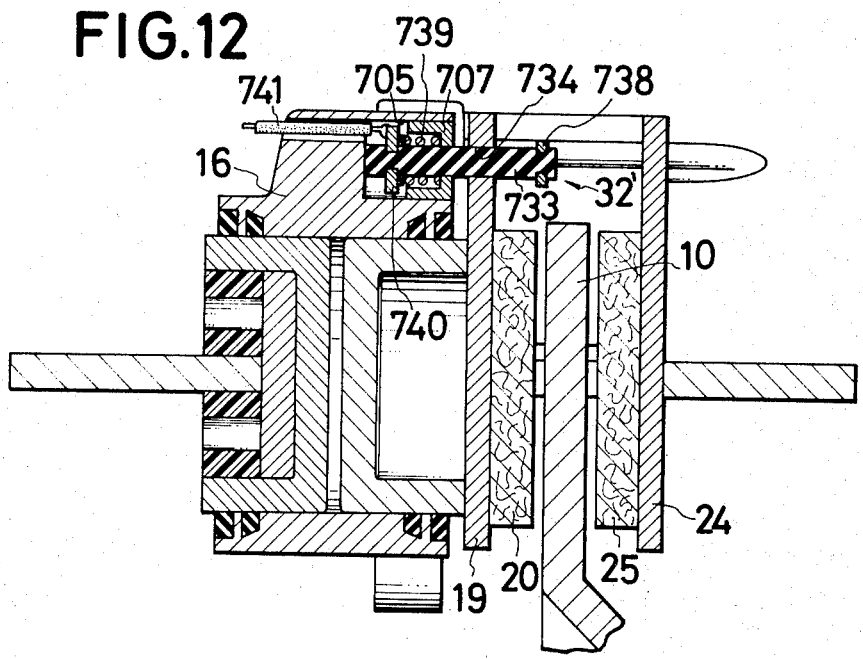
FIG. 12 is a view similar to FIG. 9, but showing a seventh modification.

The electrical system of FIG. 13 is also applicable to a seventh modified form illustrated in FIG. 12. In this form, an insulating member 733 is slidably mounted in a hole 734 of the backing plate 19. One end of the insulating member 733 is provided with a spring washer 738 fixed thereto, while the other end thereof is provided with an electrical contacting member 740 fixed thereto and received in a bore 705 of the piston housing 16. A metallic cover 707 is sealingly fixed to the opened free end of the bore 705 and permits the insulating member 733 to slide therein. A coil spring 739 is interposed between the electrical contactor 740 and cover member 707 thereby causing the electrical contactor 740 to be normally separated from the metallic cover 707. A wire 741 is connected to the contacting member 740.

When the brake linings 20 and 25 are suitable for use, the electrical contacting member 740 is separated from the piston housing 16 and metallic cover 707 so that the switch means 32' is kept open. When the brake linings 20 and 25 wear to such an extent that replacement thereof is required, the backing plate 19 urges the insulating member 733 to move towards the brake disc 10 by engagement with the spring washer 738 through the lost motion arrangement thereby causing the electrical contacting member 740 to make contact with the metallic cover 707. The switch is thus closed to establish current flow through the circuit and energize the indicating means.

What is claimed is:

1. Improved means for determining excess wear of brake linings of a disc brake assembly having a rotatable disc, two opposed backing plates for rigidly mounting the brake linings, a piston housing, piston means slidably mounted within said piston housing for actuating said backing plates and brake linings to engage opposite sides of said rotatable disc and means for supporting said backing plates, said determining means comprising, a power source, indicating means electrically connected to said power source for determining wear of the brake linings, switch means for controlling the circuit between said power source and said indicating means, said switch means including an insulating member mounted on one of said backing plates, contact means connected to said power source, means for mounting said contact means on said insulating member for normal closed contact with a non-rotating electrically conductive element of said disc brake assembly and means for controlling said contact means for breaking contact with said non-rotating electrically conductive element of said disc brake assembly when said one backing plate has moved a predetermined distance.

2. Improved means for determining excess wear of brake linings as claimed in claim 1 wherein said means for supporting said backing plates comprises pins fixedly mounted on said disc brake assembly and wherein said contact means is mounted for normal closed contact with one of said pins, and further comprising an insulating element mounted on said one pin, said contact means contacting said insulating element when said one backing plate has moved a predetermined distance to brake the normal closed contact with said pin.

3. Improved means for determining excess wear of brake linings as claimed in claim 1 wherein said piston housing is provided with a bore opening toward said rotatable disc and wherein a portion of said insulating member is mounted for movement within said bore and said contact member is mounted in said bore for normally making contact with a surface on said bore and is separated from said surface when said one backing plate moves a predetermined distance.

4. Improved means for determining excess wear of brake linings as claimed in claim 3 and further comprising a cover member fixed in the open end of said bore for enclosing said bore while permitting slidable movement of said insulating member therethrough.

5. Improved means for determining excess wear of brake linings as claimed in claim 3 wherein said bore is provided with a portion having a larger diameter then the diameter of the other portion of said bore and said contact member normally makes contact with the smaller portion thereof to close the circuit, and moves to the portion of larger diameter to break the circuit when said one backing plate has moved a predetermined distance.

6. Improved means for determining excess wear of brake linings of a disc brake assembly having a rotatable disc, two opposed backing plates for rigidly mounting the brake linings, a piston housing, piston means slidably mounted within said piston housing for actuating said backing plates and brake linings to engage opposite sides of said rotatable disc and means for supporting said backing plates, said determining means comprising, a power source, indicating means electrically connected to said power source for determining wear of the brake linings, switch means for controlling the circuit between said power source and said indicating means, said switch means including an insulating member mounted on one of said backing plates, contact means connected to said power source, means for mounting said contact means on said insulating member for normal abutting closed contact with a non-rotating electrically conductive element of said disc brake assembly, and means for controlling said normal abutting contact means for breaking contact with said non-rotating electrically conductive element of the disc brake assembly when said one backing plate has moved a predetermined distance.

7. Improved means for determining excess wear of brake linings of a disc brake assembly having a rotatable disc, two opposed backing plates for rigidly mounting the brake linings, a piston housing, piston means slidably mounted within said piston housing for actuating said backing plates and brake linings to engage opposite sides of said rotatable disc and means for supporting said backing plates, said determining means comprising, a power source, indicating means electrically connected to said power source for determining wear of the brake linings, switch means for controlling the circuit between said power source and said indicating means, said switch means including an insulating member mounted on and normally movable with one of said backing plates, contact means connected to said power source, means for mounting said contact means on said insulating means for normal abutting closed contact with said one backing plate for closing the circuit, means including said other backing plate for breaking said normal closed contact when said backing plates have moved a predetermined distance.

8. Improved means for determining excess wear of brake linings as claimed in claim 7 wherein the means for mounting said contact means on said insulating means includes a pin insulated from said contact means for breaking the normally closed abutting contact with said one backing plate when said one backing plate moves a predetermined distance, by contact of said pin with the other of said backing plates.

9. Improved means for determining excess wear of brake linings as claimed in claim 7 wherein said means for supporting said backing plates comprises pins fixedly mounted on said disc brake assembly and said insulating member comprises a tubular member slidably mounted on one of said pins, said normally closed abutting contact being opened when said insulating member is moved relative to said one backing plate by contact with said other backing plate.

10. Improved means for determining excess wear of brake linings as claimed in claim 7 and further comprising an insulated member mounted on said other backing plate for moving said contact means to break said normally closed abutting contact.

* * * * *